US007779360B1

(12) United States Patent (10) Patent No.: US 7,779,360 B1
Jones et al. (45) Date of Patent: Aug. 17, 2010

(54) MAP USER INTERFACE

(75) Inventors: Matthew Jones, Sunnyvale, CA (US); Jeffrey Veen, San Francisco, CA (US); Gregory J. Veen, San Francisco, CA (US); Douglas VanderMolen, San Jose, CA (US); Ryan K. Carver, San Francisco, CA (US)

(73) Assignee: Google Inc., Mountain View, CA (US)

( * ) Notice: Subject to any disclaimer, the term of this patent is extended or adjusted under 35 U.S.C. 154(b) by 491 days.

(21) Appl. No.: 11/733,604

(22) Filed: Apr. 10, 2007

(51) Int. Cl.
*G06F 3/00* (2006.01)
(52) U.S. Cl. .................................. 715/764; 715/835
(58) Field of Classification Search ................ 715/764, 715/835
See application file for complete search history.

(56) References Cited

U.S. PATENT DOCUMENTS 5,675,733 A * 10/1997 Williams .................... 709/206
6,665,715 B1 * 12/2003 Houri ......................... 709/223
7,542,846 B2 * 6/2009 Motoyama et al. .......... 701/208
2002/0138288 A1 * 9/2002 Kurpis ........................... 705/1
2006/0282304 A1 * 12/2006 Bedard et al. ................ 705/10
2007/0016435 A1 * 1/2007 Bevington ..................... 705/1
2008/0109758 A1 * 5/2008 Stambaugh ................ 715/835

OTHER PUBLICATIONS

US Flash Map, Comapny News, Apr. 10, 2009, pp. 1-12 http://usflashmap.com/company/news.htm.*

* cited by examiner

*Primary Examiner*—Dennis Bonshock
(74) *Attorney, Agent, or Firm*—Fish & Richardson P.C.

(57) ABSTRACT

A first map comprising one or more selectable regions is arranged in an interface environment. Each of the one or more selectable regions are associated with respective content. The interface environment also includes an abstraction associated with at least one of the one or more selectable regions, wherein the interface environment is configured to display a second map representing the at least one of the one or more selectable regions based upon an event.

19 Claims, 8 Drawing Sheets

MAP USER INTERFACE

FIELD

The following disclosure relates to graphical user interfaces for information presentation.

BACKGROUND

A web publisher is an entity, such as person or an enterprise, that hosts web pages or websites that can be accessed over a network, such as the Internet. The publisher can monitor analytical data related to user visits and links to the publisher's web pages or websites. Example analytical data includes data related to domains and/or websites from which visitors arrived and to which the visitors departed; traffic patterns, e.g., navigation clicks, of visitors within the publisher's website; visitor actions, e.g., purchases, filling out of forms, etc. and other actions that a visitor may take in relation to the publisher's website.

The analysis of such analytical data can, for example, inform the publisher of how visitors found the publisher's website and how the visitors interacted with the publisher's website. With this understanding, the publisher can implement changes to increase revenue generation and/or improve the visitor experience. For example, a publisher can focus marketing resources on advertising campaigns, and/or identify website bottlenecks that impede the visitor experience, and/or identify other publishers as potential partners for cross-linking, etc.

Analytical tools that facilitate the collection and analysis of such analytical data are available to publishers. An example analytical suite is Google analytics, and which is available from Google, Inc., in Mountain View, Calif. Although analytical information can be presented in table format, it is often useful for a publisher to visually see from what parts of the world the analytical data relates to.

SUMMARY

Disclosed herein are systems and methods of generating a user interface. In one implementation, an interface environment includes a first map comprising one or more selectable regions, where each of the one or more selectable regions are associated with respective content. The interface environment also includes an abstraction associated with at least one of the one or more selectable regions, where the interface environment is configured to display a second map representing the at least one of the one or more selectable regions based upon an event.

In another implementation, one or more computer readable media are used to cause a processor to perform the operations including generating an interface environment including a first map, the first map including one or more selectable regions, each of the one or more selectable regions associated with respective content, generating an abstraction arranged within the interface environment, where the abstraction is associated with at least one of the one or more selectable regions, receiving an event, and displaying a second map representing the at least one of the one or more selectable regions responsive to the event.

These general and specific aspects may be implemented using a system, a method, or a computer program, or any combination of systems, methods, and computer programs.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all implementations are shown. Indeed, these implementations can be embodied in many different forms and should not be construed as limited to the implementations set forth herein; rather, these implementations are provided so that this disclosure will satisfy applicable legal requirements. Like numbers refer to like elements throughout.

In this disclosure, the term "site" or "website" includes any domain or subdomain (e.g., google.com, labs.google.com, etc.) or a domain plus a uniform resource locator prefix (e.g., geocities.com/Athens/).

Figure 1:
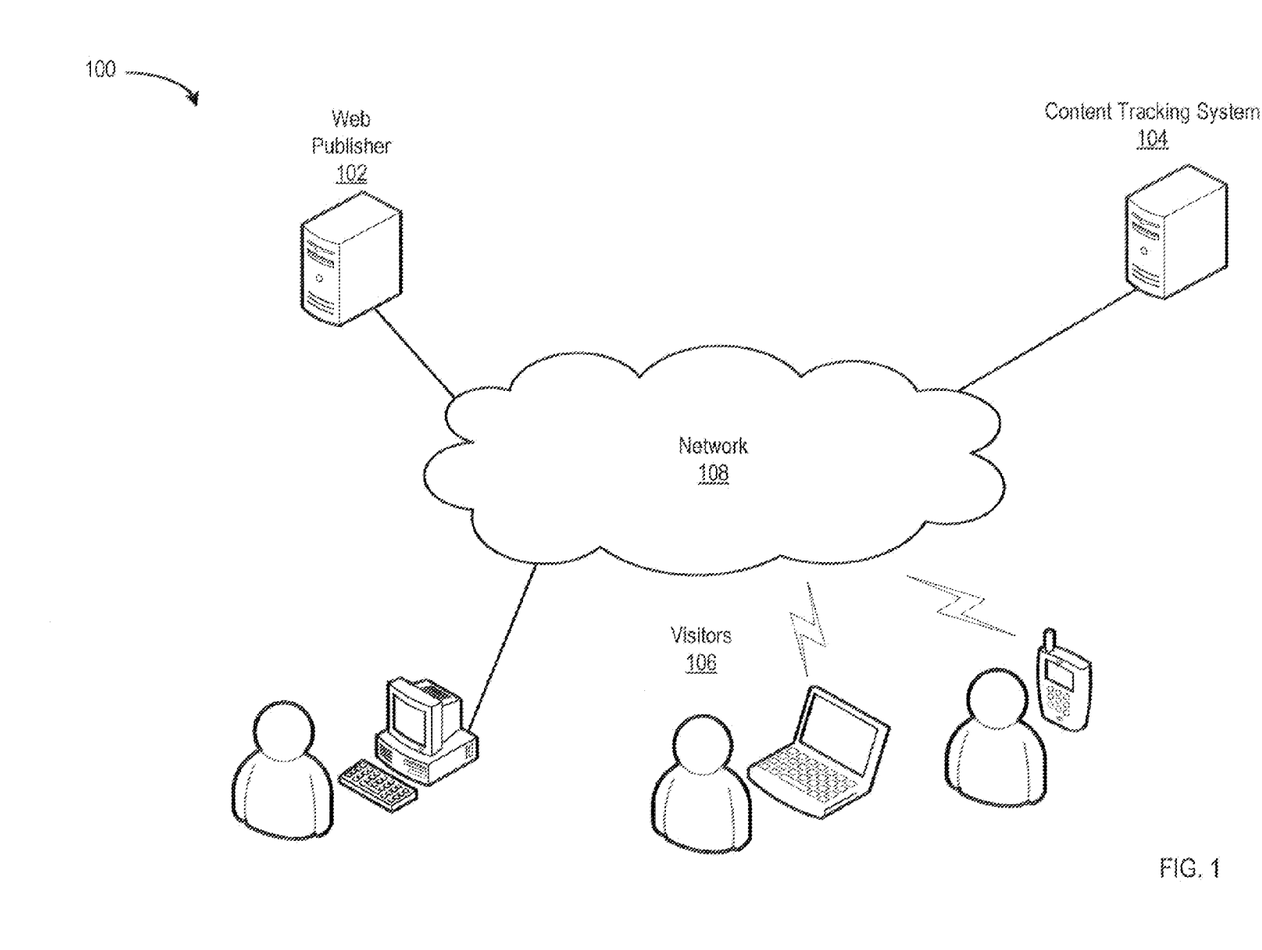
FIG. 1 is a block diagram of an example online content system.

FIG. 1 is a block diagram of an implementation of an example online content system 100. In one implementation, the online content system 100 can include a web publisher 102 and a content tracking system 104. The content tracking system 104 can directly, or indirectly, enter, maintain, and track content information of the web publisher 102. Content information can, for example, be related to traffic patterns, e.g., navigation clicks, of visitors within the publisher's website; visitor actions, e.g., purchases, filling out of forms, etc. and other actions that a visitor may take in relation to the publisher's website.

Other entities, such as visitors 106 can provide usage information to the content tracking system 104, such as, for example, the number of times each visitor 106 visited the website of the web publisher 102, or the number of pages on the website visited by each visitor 106.

A computer network 108, such as a local area network (LAN), wide area network (WAN), the Internet, or a combination thereof, connects the web publisher 102, the content tracking system 104, the visitors 106. One example of web publisher 102 is a general content server that receives requests for content (e.g., articles, discussion threads, music, video, graphics, search results, web page listings, information feeds, etc.), retrieves the requested content in response to the request, and displays the information in the form of a website. As can be appreciated from the foregoing, the content tracking system 104 can serve web publisher 102, such a website publisher. The content tracking system 104 permits tracking of content provided by the publisher 102.

Figure 2:
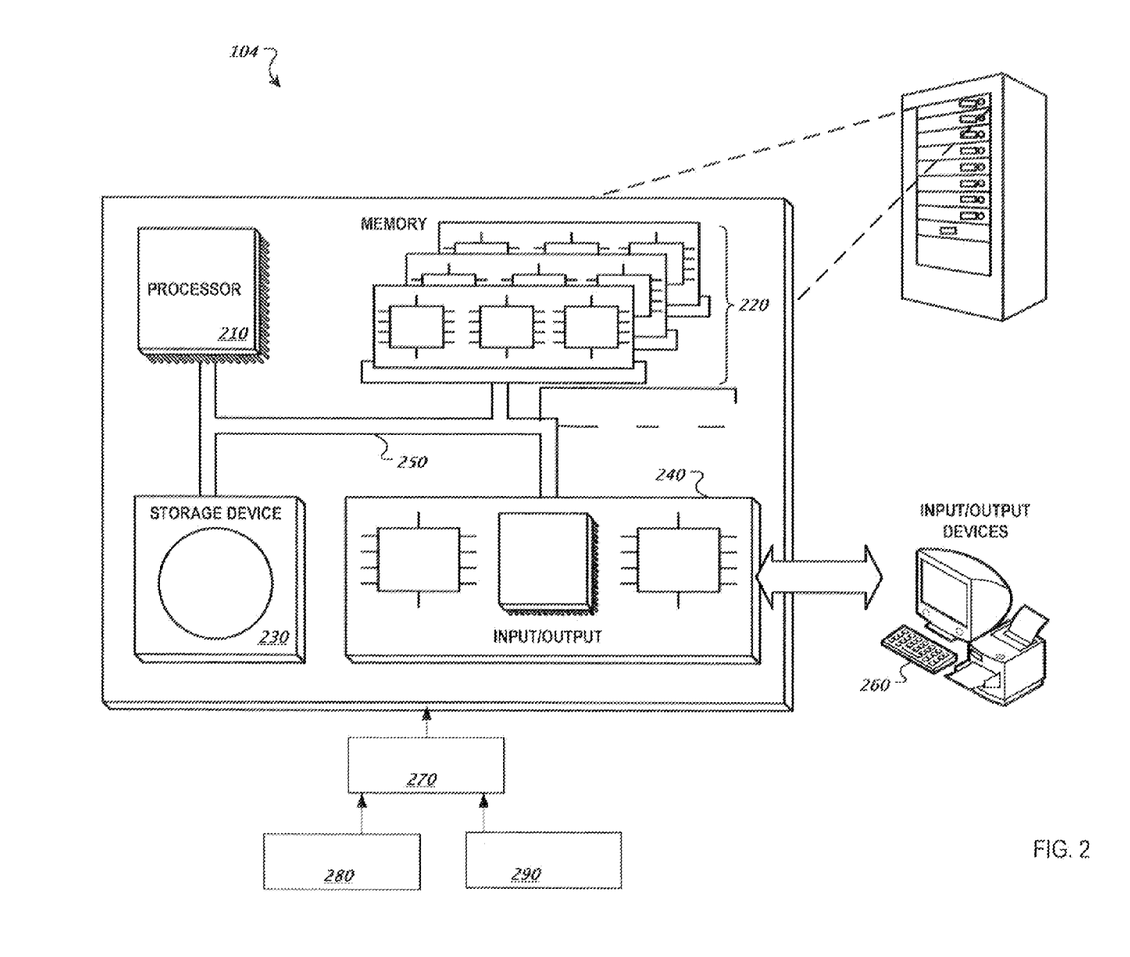
FIG. 2 is a block diagram of an example content tracking system.

FIG. 2 is block diagram of an exemplary content tracking system 104, according to an illustrative embodiment. The system 104 includes a processor 212, a memory 220, a storage device 230, and an input/output device 240. Each of the components 212, 220, 230, and 240 can, for example, be interconnected using a system bus 250. The processor 212 is capable of processing instructions for execution within the system 104. In one implementation, the processor 212 is a single-threaded processor. In another implementation, the processor 212 is a multi-threaded processor. The processor 212 is capable of processing instructions stored in the memory 220 or on the storage device 230. The memory 220 stores information within the system 104. In one implementation, the memory 220 is a computer-readable medium. In one implementation, the memory 220 is a volatile memory unit. In another implementation, the memory 220 is a non-volatile memory unit.

The storage device 230 is capable of providing mass storage for the system 104. In one implementation, the storage device 230 is a computer-readable medium. In various different implementations, the storage device 230 can, for example, include a hard disk device, an optical disk device, USB disk drives, or some other large capacity storage device. The input/output device 240 provides input/output operations for the system 104. In one implementation, the input/output device 240 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 260. Other implementations, however, can also be used, such as mobile computing devices, mobile communication devices, set-top box television client devices, etc.

The system 104 can also include a user interface (UI) engine 270, a presentation engine 280, and a statistics engine 290. The engines may be implemented in software as software modules or instructions, or may be implemented in hardware, or in a combination of software and hardware. In one implementation, the UI engine 270 manages a user interface to facilitate data presentation for the presentation engine 280 and functional processing in response to user inputs. In one implementation, the statistics engine 290 can provide statistics to the UI engine 270 to facilitate the data presentation for the presentation engine 280. Though the engines are shown together as part of the system 104, one or more of the engines may be remotely located.

Figure 3:
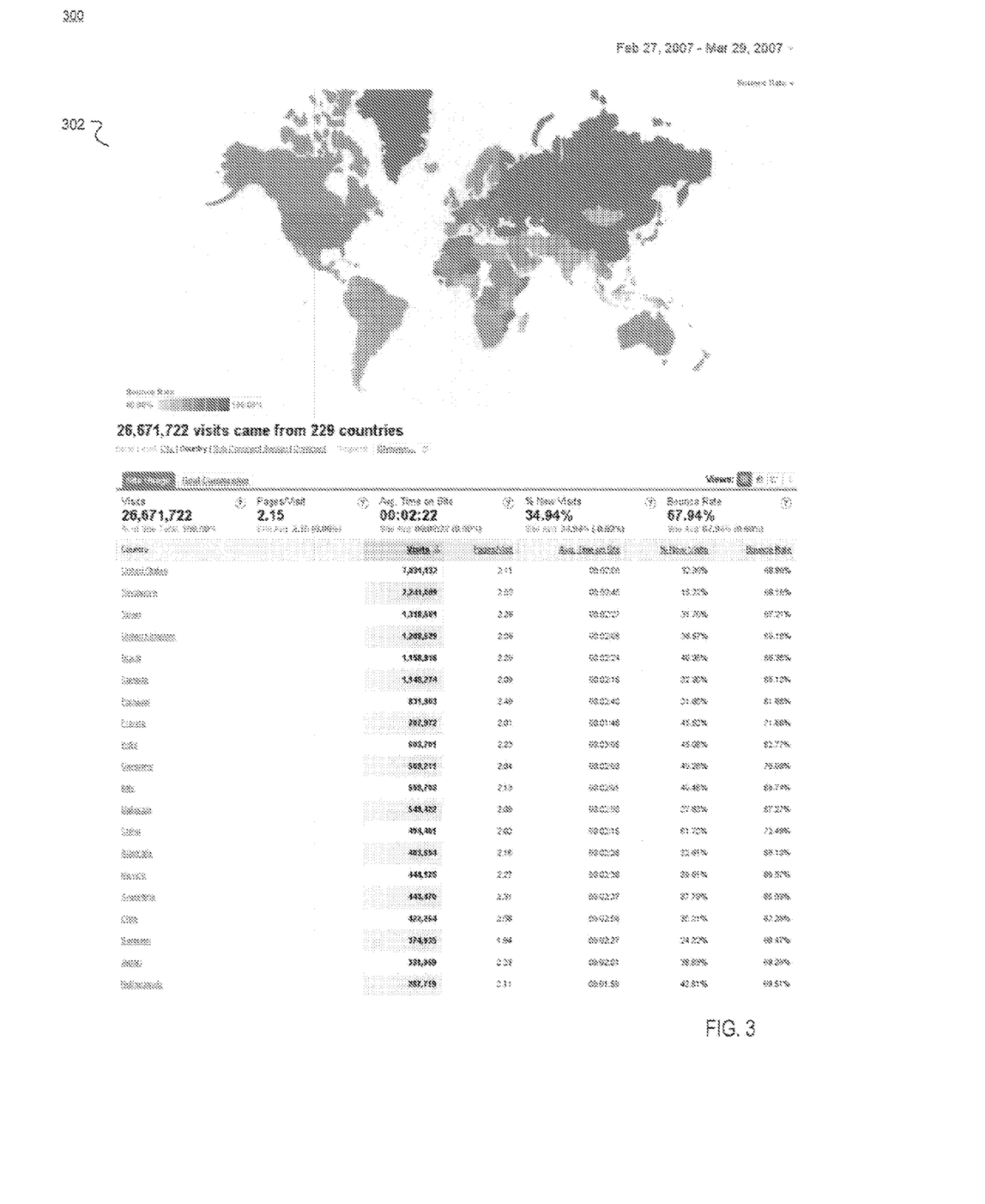
FIG. 3-7 are block diagrams of an example interface environments.

FIG. 3 is a block diagram of an example interface environment 300. The interface environment 300 can, for example, be provided to a publisher 102 to allow the publisher 102 to view information associated with the publisher's website. According to an implementation, the interface environment can be generated by the UI engine 270. The interface environment 300 can include a first map 302 arranged within the interface environment 300. In one implementation, the first map 302 can include one or more selectable regions, and can be arranged, for example, at the top of the interface environment 300. However, in other examples, the first map 302 can be arranged in other ways within the interface environment 300. The first map 302 can, for example, include a world map, a continent map, a sub continent map, a country map, a territory map, a region map, or a state map. The one or more selectable regions can, for example, correspond to continents, sub-continent regions, countries, states, or cities. Each of the one or more selectable regions can be associated with respective content. The respective content can, for example, include one or more statistics, as will be described below.

Figure 4:
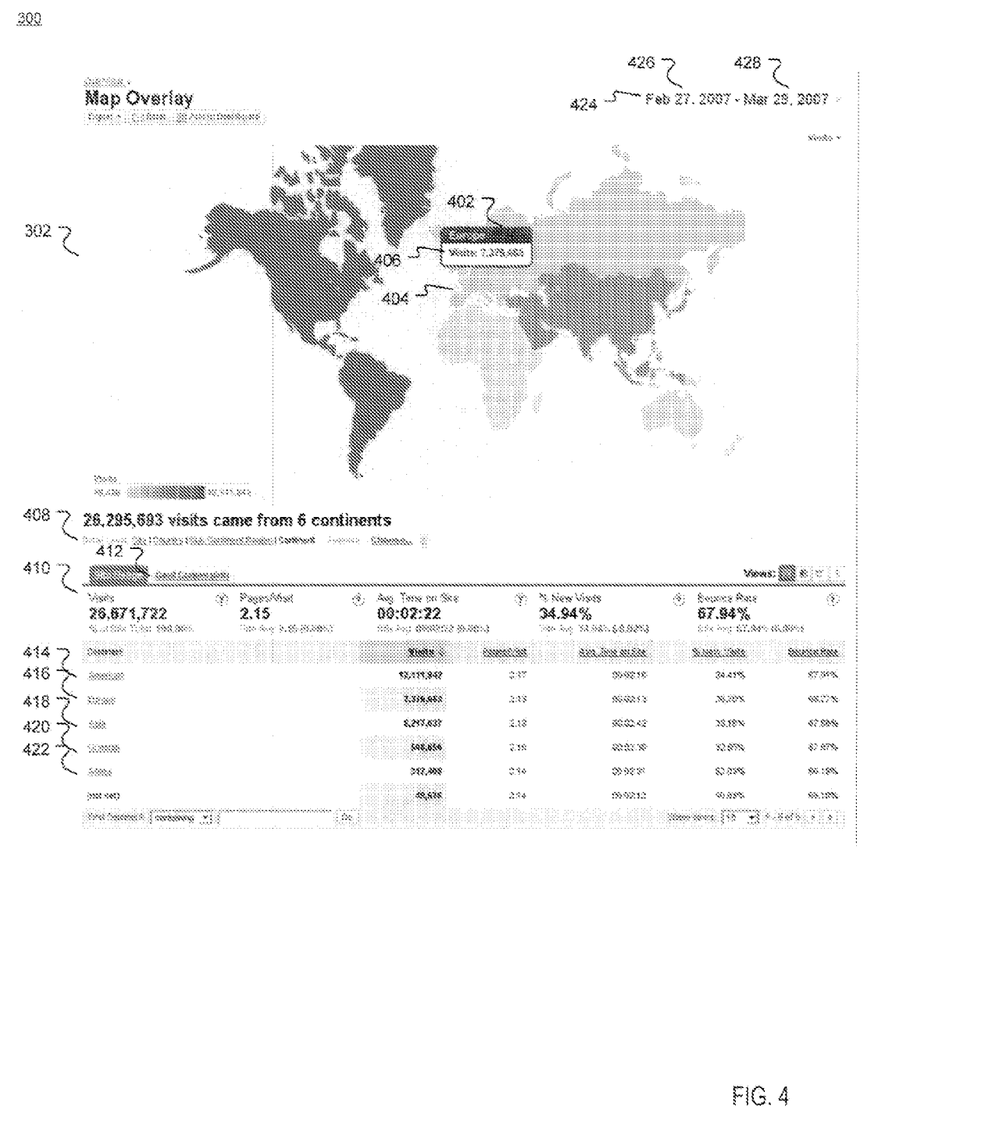

FIG. 4 is another block diagram of the example interface environment 300. In one implementation, the interface environment 300 can include an abstraction 402 associated with selectable regions. In an implementation, a region 404 can be selected (e.g., highlighted) upon the occurrence of an event. The event can, for example, include a user moving a mouse to hover above the selectable region 404. If a user moves the mouse across the first map 302, every time a different region is pointed to by the mouse, the region can be selected. In one implementation, the selectable region that is pointed to by a mouse pointer can be selected or displayed in a color different than the rest of the selectable regions.

In one implementation, the abstraction 402 is a pop-up window and can appear upon the occurrence of an event, such as when a user moves a mouse across the map 302 and points to a specific region. The abstraction 402 can, for example, include a statistic 406 from the group of one or more statistics associated with each selectable region. In one implementation, the one or more statistics can, for example, be calculated by the statistics engine 290. In one implementation, the pop-up window can be generated by JavaScript, but can be generated by other means as well.

In one implementation, the abstraction 402 is a windows that is smaller than the first map 302. The window can, for example, be displayed on top of the first map 302 or on top of other areas of the user environment 300. The window can, for example, be a pop-up window as described above. In one implementation, the abstraction 402 is a hover ad, which can use DHTML to appear in front of the interface environment 300. The hover ad can, for example, be superimposed over the interface environment 300 in a transparent layer.

In one implementation, the abstraction 402 can be associated with the region 404 being selected. The abstraction 402 can, for example, appear at the same time that the region 404 is highlighted upon the occurrence of an event. According to an implementation, if a user moves a mouse to a region on the first map 302, the abstraction 402 can appear, and the same region on the first map 302 can be highlighted in a color different than the rest of regions on the first map 302.

In one implementation, the abstraction 402 can update to reflect the region associated with the abstraction 402. If a user, for example, moves a mouse on a region on the first map 302, the abstraction 402 can include a statistic 406 that is associated with that region. If the user moves the mouse to a second region on the first map 302, the abstraction 402 can update to reflect a statistic 406 associated with the second region.

In one implementation, the abstraction 402 can include detailed information about an area on the first map 302. The abstraction 402 can, for example, include a statistic, as described above, as well as other detailed information relating to an area on the first map 302, the abstraction 402 can, for example, include a graph or a chart relating to an area on the first map 302.

The one or more statistics can, for example, be associated with one or more users' interactions with a publisher's website. In one implementation, the one or more statistics can be displayed in area 410 according to the one or more selectable regions of the first map 302. The area 410 can, for example, include the same number of regions as the number of selectable regions on the first map 302. For example, the first map 302 includes 5 selectable regions, and the area 408 includes the same 5 regions: "Americas" 414, "Europe" 416, "Asia" 418, "Oceania" 420, and "Africa" 422. The one or more statistics can, for example, include a number of visits, a number of pages per visit, an average time on the website, a percentage of new visits to the website, a bounce rate, at least one conversion rate, a per visit goal value, and/or like statistics associated with analytic data used in website tracking. Each of the statistics can be unique to the selectable region. According to an implementation, each of the statistics can be calculated by the statistics engine 290.

A "visits" statistics can, for example, include the number of visits to the publisher's website from a particular region in the world. The visits statistic can, for example, display the number of different users that visited the website from a region in the world. For example, as shown in the abstraction 402, "7,376,653" visitors from "Europe" visited the publisher's website.

A "pages/visit" statistic can, for example, include the average number of website pages one or more visitors visited on the publisher's website in a single visit. A website can, for example, include of multiple website pages. A user can, for example, visit a number of pages in a single visit to the website. The "pages/visit" statistic can, for example, include the average number of pages visited by the visitors from a particular region in the world.

An "average time on site" statistic can, for example, include the average amount of time one or more visitors spent on a publisher's website. The "average time on site" statistic can, for example, include the average amount of time users of a particular region spent on the website. For example, if a first user from region A spent 10 minutes on the website and a second user from region A spent 30 minutes on the same website, then the "Average Time on Site" for the website for region A can be 20 minutes (an average of 10 minutes and 30 minutes).

A "% new visits" can, for example, include the percentage of new visits to the publisher's website. Next, a "bounce rate" can, for example, be the percentage of website visitors who arrive at any individual page on the website, then leave without getting any deeper into the site. For example, the "bounce rate" can be a percentage of visitors who arrive at the main page of a website but do not visit any other page on the website.

A "conversion rate" statistic can, for example, be associated with a conversion. A conversion occurs when a user consummates a transaction related to the publisher's website. What constitutes a conversion may vary from case to case and can be determined in a variety of ways. For example, it may be the case that a conversion occurs when a visitor clicks on an ad, is referred to a publisher's website, and consummates a purchase there before leaving that web page. Many other definitions of what constitutes a conversion are possible. The ratio of the number of conversions to the number of impressions of the ad (i.e., the number of times an ad is displayed) is commonly referred to as the conversion rate.

In another implementation, one or more of the statistics can be a "Goal1 Conversion Rate," a "Goal2 Conversion Rate," a "Goal3 Conversion Rate," or a "Goal4 Conversion Rate." In one implementation, a publisher 102 can define up to four goal conversion rates for the publisher's website using the statistics engine 290. For example, if a goal is to "buy a book" on the publisher's website and that book costs, $10, the publisher 102 can define the value of that goal as $10. The "Per Visit Goal Value" statistic can be the sum of the value of all the goals which were completed, divided by the number of visits to the site. The "Goal Conversion Rate" statistics and the "Per Visit Goal Value" statistic can, for example, be calculated by the statistic engine 290.

In the example interface environment 300, the abstraction 402 is associated with the selectable region 404. For example, the selectable region 404 is "Europe" and the abstraction 402 can include a visits statistic 406. Therefore, in this example, 7,376,653 people from Europe visited the website of the publisher 102.

Figure 5:
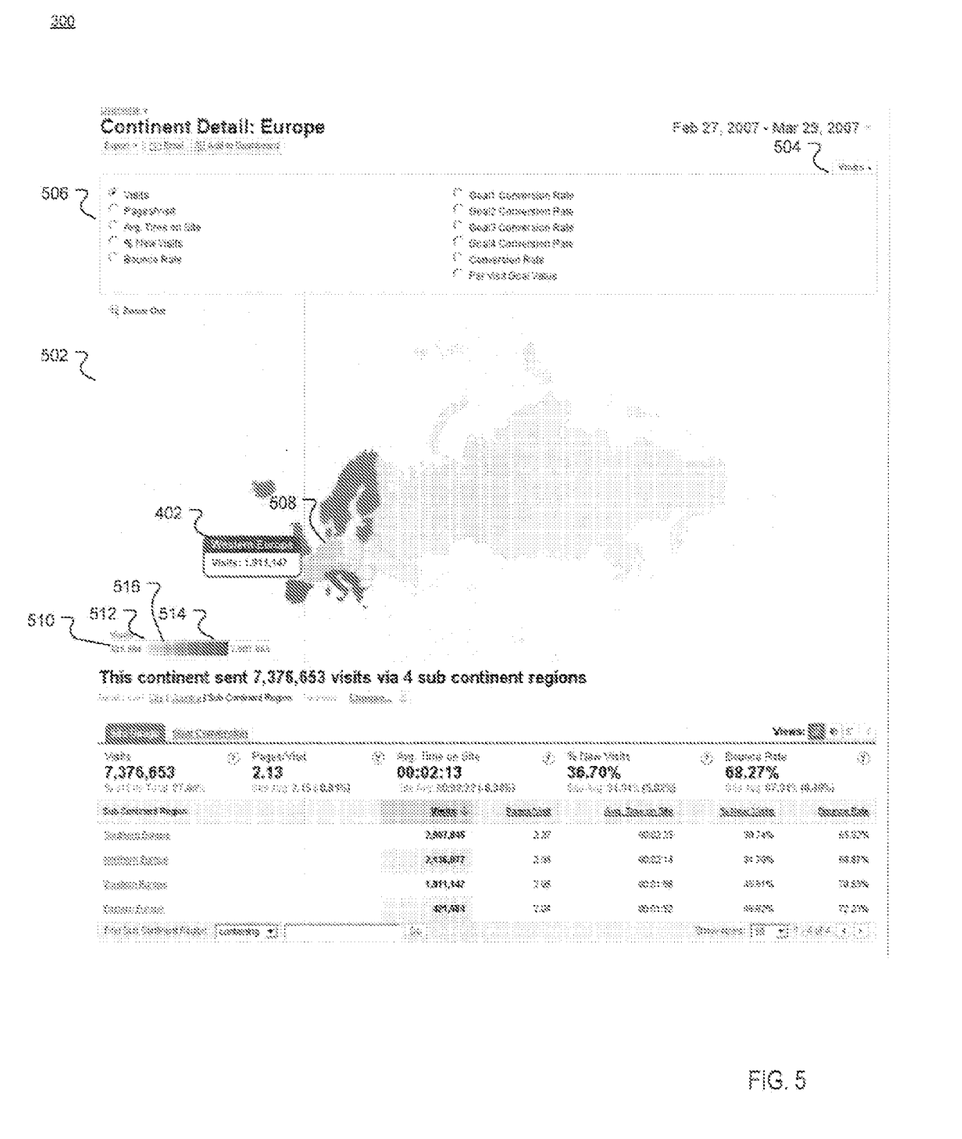

In one implementation, the level of detail of the first map 302 and the second map 502 can correspond to one or more options 408. The options 408 can be associated with one or more regions. The level of detail can, for example, correspond to how the information on the first map is displayed. The information can, for example, be displayed grouped by continents, subcontinents, countries, states, or cities.

In one implementation, the selectable regions can be defined according to the level of detail of the first map 302. For example, if the first map 302 is a map of the world, the first map 302 can be displayed with a level of detail of continents, subcontinents, countries, or cities. The level of detail can, for example, define how the selectable regions are defined. If the level of detail is defined as "continents," then the selectable regions are grouped by continents. If, for example, the level of details is defined as countries, then the selectable regions are grouped by countries. For example, if the first map 302 is a map of the world and the level of detail 408 is "continents," then each of the selectable regions on the first map 302 are continents. A user can only select from one or more continents on the first map 302. If the level of detail 408 is cities, then each of the selectable regions on the first map 302 are cities.

In one implementation, the interface environment 300 can, for example, include an area 410 to display the one or more statistics for each of the one or more selectable regions. The area 408 can, for example, be arranged at the bottom of the interface environment 300. However, in other examples, the area 410 can be arranged in other ways within the interface environment 300.

In one implementation, the area 410 can include each of the one or more statistics for each of the selectable region. The one or more statistics can be arranged in a number of different ways. In one implementation, the statistics can be grouped in one or more groups and can be displayed in a table format with corresponding tabs 412 to define the one or more groups.

In one implementation, the interface environment 300 can be associated with a date range 424. The date range 424 can, for example, correspond to a time period to track the activity of users on the publisher's website. The date range 424 can be selected by a user by defining a starting date 426 and an ending date 428. In one implementation, only the activity within the date range 424 can be tracked and measured by the system web publisher. The content associated with each selectable region can, for example, be associated with the date range 424. Each of the one or more statistics can correspond to the date range 424. For example, in the example interface environment 300, the number of visits 406 from "Europe" was "7,376,653" between "Feb. 27, 2007," "Mar. 29, 2007."

FIG. 5 is another block diagram of the example interface environment 300. In one implementation, the interface environment 300 can display a second map 502 of the selectable region 404. For example, the selectable region 404 in FIG. 4 was of the continent "Europe," therefore, the second map 502 is a map of "Europe." In one implementation, the transition to the second map 502 can be based upon an event. The event can, for example, be a mouse click by a publisher 102 on the first map 302. The mouse click can, for example, occur anywhere on the first map 302. In one implementation, the location on the first map 302 where the event occurs can be directly associated with the second map 502. The second map 502 can, for example, be a map of a region within the first map 302. The second map 502 can, for example, be any continent in the world, depending on where on the first map 302 the event, e.g., mouse click, occurs. In one implementation, the second map includes a continent map, a sub continent map, a country map, a state map, a region map, a territory map, or a city map.

In one implementation, the second map 502 replaces the first 302 on the interface 300. Therefore, the first map 302 no longer appears on the interface 300. In one implementation, the second map 502 appears on the interface 300 along with the first map 302. The second map 502 can, for example, appear below or above the first map 302. In one implementation, the second map 502 is rendered in lieu of the first map 302.

In one implementation, the display of the second map 502 can correspond to the location of the event on the first map 302. For example, if a publisher 102 clicks on the first map 302 in a particular region, the second map 502 can correspond to that region. If a user, for example, clicks anywhere on the continent "Europe," in the first map, then the second map 502 can include a map of Europe.

In one implementation, the interface environment 300 can, for example, include a select option 504 to select one statistic of the one or more statistics for the first abstraction 402. The select option 504 can, for example, be activated by an event by a publisher 102. The event can, for example, include a mouse click on the select option 504 by the publisher 102. In one implementation, once the event occurs for the select option 504 to appear, a user can select one of the one or more statistics 506. The user can, for example, select a number of visits, a number of pages per visit, an average time on the website, a percentage of new visits to the website, a bounce rate, at least one conversion rate, or a per visit goal value.

In one implementation, the abstraction 402 can be updated based on the one or more statistics 506 selected in the select option 504. If, for example, a publisher 102 selects a different statistic from the one or more statistics 506, the abstraction 402 can update to reflect the statistic selected by the publisher 102.

For example, the abstraction 402 for the selectable region "Western Europe" is associated with the statistic "Visits." The second map 502 shows "1,911,147" people visited the website of the publisher 102 from "Western Europe." If the publisher 102 selects a different statistic from the list of one or more statistics 506, e.g., "Avg. Time of Site," the abstraction 402 can update to reflect this new statistic as shown in FIG. 6.

Figure 6:
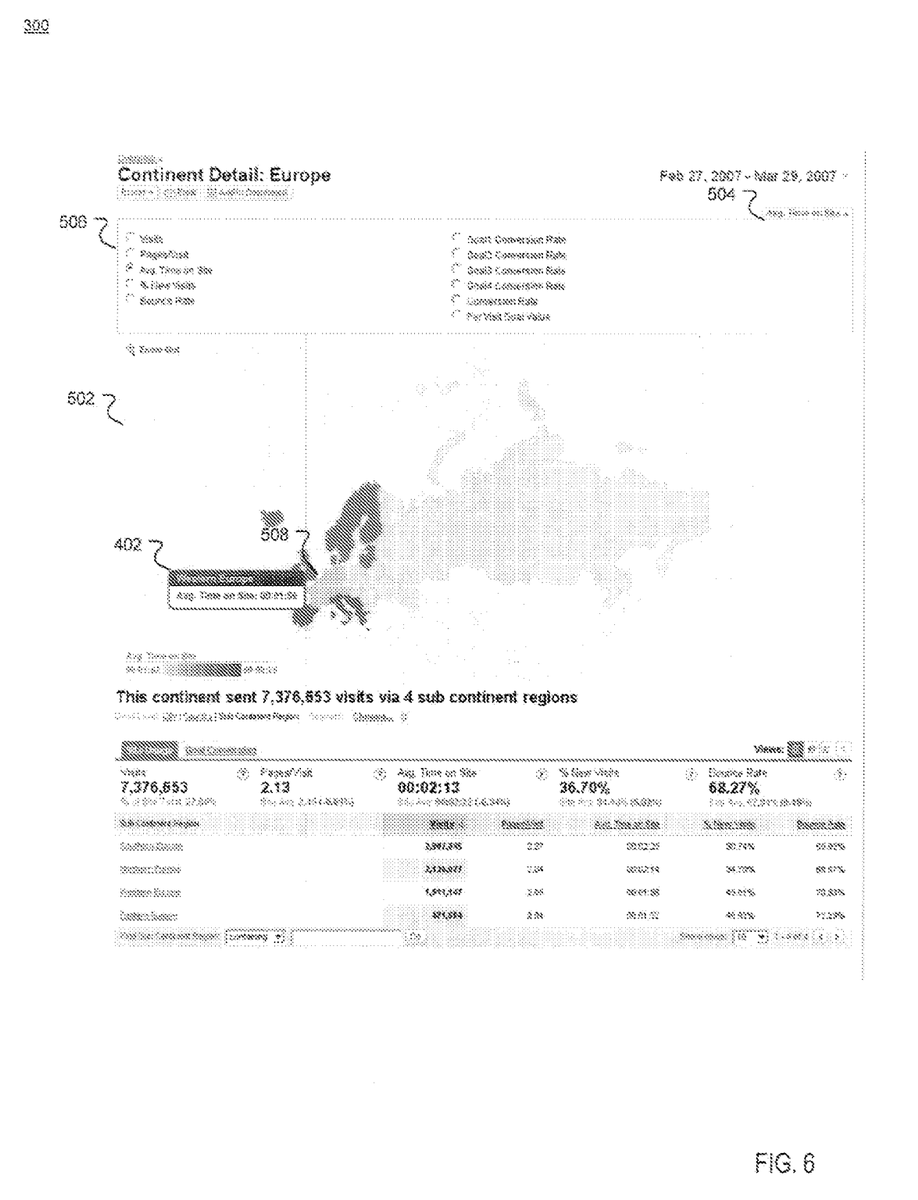

In the example on FIG. 6, the publisher 102 selected "Avg. Time on site," so the abstraction 402 changed from "visits" to "Avg. time on site" and shows that visitors to the publisher's website spent an average of "1:56" on the publisher's website. The statistic associated with the abstraction 402 can be directly associated with the statistic selected from the one or more statistics 506.

In another implementation, a color scale 510 can correspond to each of the one or more statistics. The color scale 510 can, for example, be associated with the colors used on the second map 302. In one implementation, the first map 302 can also be associated with the color scale 510. The scale 510 can, for example, include a starting color 512, an ending color 514, and a range 516 of colors in between. The starting color 512 can, for example, be associated with the lowest number corresponding to one of the one or more statistics. The ending color 514 can, for example be associated with the highest number corresponding to the one or more statistics. Each of the selectable regions on the second map 502 can, for example, be colored according to the color scale 510 depending on the statistic shown on the interface environment 300.

Figure 7:
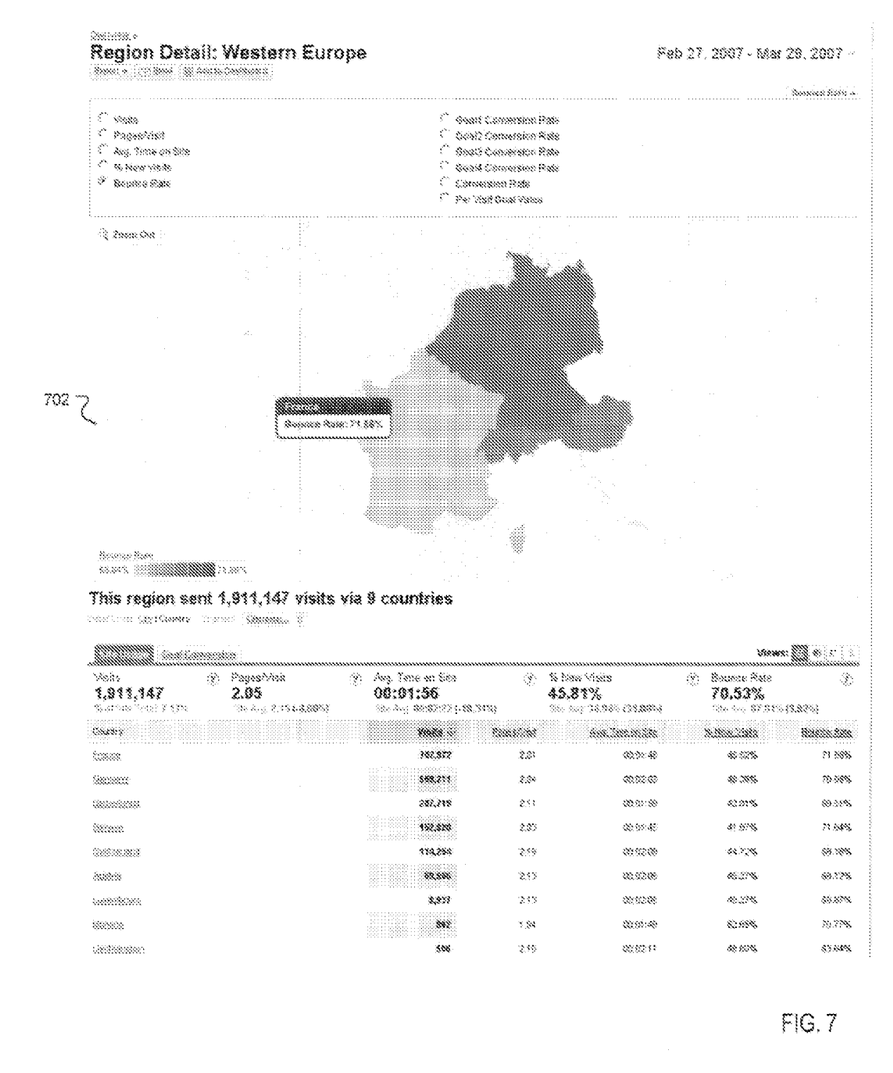

FIG. 7 is another block diagram of the example interface environment 300. In one implementation, the interface environment 300 can display a third map 702 representing the selectable region 508. The display of the third map 702 can, for example, be based upon an event. The event can, for example, include a mouse click on one of the selectable regions on the second map 502.

For example, if a publisher clicks on the selectable region 508 on the second map 502, the interface environment 300 can transition to display a third map 702 of the selectable region 508. In the example interface environment of FIG. 7, the third map 702 of "Western Europe" is a map of the selectable region 508 on the second map 502.

Figure 8:
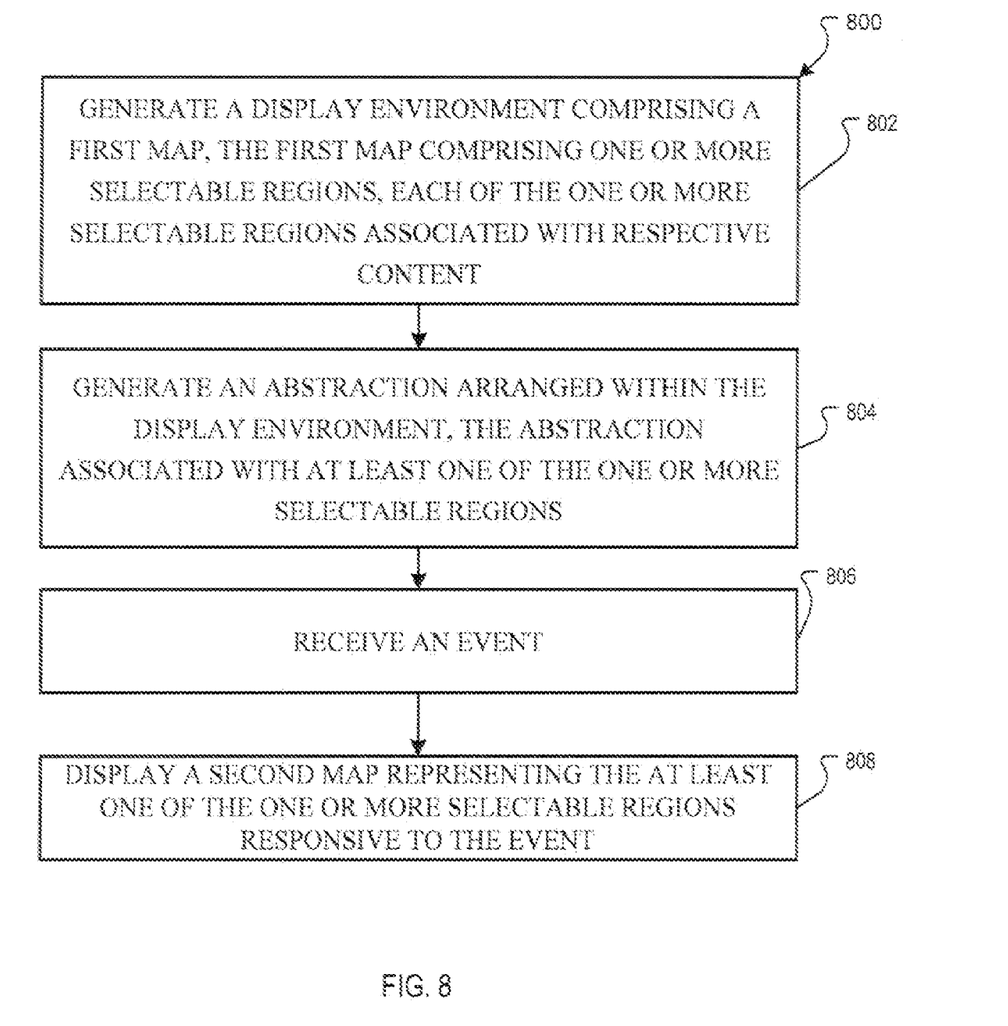
FIG. 8 is a block diagram flow chart of an example process for generating an interface environment.

FIG. 8 is a flow diagram of an example user interface generation process 800. An interface environment (e.g., the interface environment 300 of FIGS. 3-7) is generated (block 802). The interface environment can include a first map having one or more selectable regions, where each of the selectable regions are associated with respective content, such as the statistics described above. According to an implementation, the interface environment can be generated by the presentation engine 280, which can be configured to receive data and render graphics for display on a display device.

An abstraction (e.g., abstraction 402 of FIG. 4) is generated (block 804). The abstraction can be associated with at least one of the one or more selectable regions. According to an implementation, the abstraction can be generated by the presentation engine 280, which can be configured to receive data and render graphics for display on a display device.

An event can be received/detected (block 806). According to an implementation, the event can be received by the presentation engine 280, which can be configured to receive data and render graphics for display on a display device. A second map (e.g., the second map 502 of FIG. 5) can be displayed (block 808). The second map can represent the at least one of the one or more selectable region responsive to the event. According to an implementation, the second map can be displayed by the presentation engine 280, which can be configured to receive data and render graphics for display on a display device. In one implementation, the statistics on the display (e.g., at the bottom) can change to reflect the new map.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or structural means, may also be utilized to implement corresponding software structures and algorithms, and equivalents thereof.

It will be apparent to one of ordinary skill in the art that aspects of the invention, as described above, can be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

That which is claimed:

1. One or more computer readable media storing instructions that are executable by a processing device, and upon such execution cause the processing device to perform operations comprising:

providing an interface environment to a publisher of a website, the interface environment comprising a map that includes selectable regions which each correspond to a different geographic area on the map;

determining, for each selectable region, an analytical value relating to past visits to the website which originated from the geographic area that corresponds to the selectable region;

color coding each selectable region on the map based on the analytical value determined for the respective selectable region in relation to the analytical values determined for other selectable regions on the map;

determining that the publisher has adjusted a level of detail setting;

in response to determining that the publisher has adjusted the level of detail setting, determining, for each selectable sub-region associated with the selectable regions, an analytical value relating to the past visits to the website which originated from a geographic area that corresponds to the selectable sub-region color coding each selectable sub-region based on the analytical value determined for the respective selectable sub-region in relation to the analytical values determined for other selectable sub-regions;

providing a type of analytical value control on the interface environment;

determining that the publisher has adjusted the type of analytical value control; and adjusting a type of analytical value to generate based on determining that the publisher has adjusted the type of analytical value control.

2. A computer-implemented method comprising:

providing, by one or more processors, an interface environment to a publisher of a website, the interface environment comprising a map that includes selectable regions which each correspond to a different geographic area on the map;

determining, for each selectable region, an analytical value relating to past visits to the website which originated from the geographic area that corresponds to the selectable region;

color coding each selectable region on the map based on the analytical value determined for the respective selectable region in relation to the analytical values determined for other selectable regions on the map;

determining that the publisher has adjusted a level of detail setting;

in response to determining that the publisher has adjusted the level of detail setting, determining, for each selectable sub-region associated with the selectable regions, an analytical value relating to the past visits to the website which originated from a geographic area that corresponds to the selectable sub-region;

color coding each selectable sub-region based on the analytical value determined for the respective selectable sub-region in relation to the analytical values determined for other selectable sub-regions;

providing a type of analytical value control on the interface environment;

determining that the publisher has adjusted the type of analytical value control; and adjusting a type of analytical value to generate based on determining that the publisher has adjusted the type of analytical value control.

3. The method of claim 2, wherein the map comprises a world map, and the selectable regions each correspond to different continents, sub-continent regions, countries, states or cities.

4. The method of claim 2, further comprising:

detecting a mouseover event over a particular selectable region; and providing an abstraction for display adjacent to the map, the abstraction including the analytical value associated with the particular selectable region.

5. The method of claim 4, wherein the abstraction comprises a pop-up window.

6. The method of claim 2, wherein determining, for each selectable region, an analytical value further comprises determining, for each selectable region, a quantity of visits to the website which originated from the geographic area that corresponds to the selectable region.

7. The method of claim 2, wherein determining, for each selectable region, an analytical value further comprises determining an average quantity of pages per visit, for visits to the website which originated from the geographic area that corresponds to the selectable region.

8. The method of claim 2, wherein determining, for each selectable region, an analytical value further comprises determining an average time per visit, for visits to the website which originated from the geographic area that corresponds to the selectable region.

9. The method of claim 2, wherein determining, for each selectable region, an analytical value further comprises determining a percentage of new visits to the website, for visits to the website which originated from the geographic area that corresponds to the selectable region.

10. The method of claim 2, wherein determining, for each selectable region, an analytical value further comprises determining a bounce rate for visits to the website which originated from the geographic area that corresponds to the selectable region, the bounce rate establishing a percentage of the visits which visit a main page of a website but do not visit any other page of the website.

11. The method of claim 2, wherein determining, for each selectable region, an analytical value further comprises determining one or more conversion rates for visits to the website which originated from the geographic area that corresponds to the selectable region.

12. The method of claim 2, wherein determining, for each selectable region, an analytical value further comprises determining a per visit goal value for visits to the website which originated from the geographic area that corresponds to the selectable region.

13. The method of claim 2, wherein providing the abstraction for display adjacent to the map further comprises providing the abstraction for display over the map.

14. A system comprising:

one or more computers; and a computer-readable medium coupled to the one or more computers having instructions stored thereon which, when executed by the one or more computers, cause the one or more computers to perform operations comprising:

providing an interface environment to a publisher of a website, the interface environment comprising a map that includes selectable regions which each correspond to a different geographic area on the map, determining, for each selectable region, an analytical value relating to past visits to the website which originated from the geographic area that corresponds to the selectable region, color coding each selectable region on the map based on the analytical value determined for the respective selectable region in relation to the analytical values determined for other selectable regions on the map, determining that the publisher has adjusted a level of detail setting, in response to determining that the publisher has adjusted the level of detail setting, determining, for each selectable sub-region associated with the selectable regions, an analytical value relating to the past visits to the website which originated from a geographic area that corresponds to the selectable sub-region, color coding each selectable sub-region based on the analytical value determined for the respective selectable sub-region in relation to the analytical values determined for other selectable sub-regions, providing a type of analytical value control on the interface environment, determining that the publisher has adjusted the type of analytical value control, and adjusting a type of analytical value to generate based on determining that the publisher has adjusted the type of analytical value control.

15. The system of claim 14, wherein determining, for each selectable region, an analytical value further comprises determining, for each selectable region, a quantity of visits to the website which originated from the geographic area that corresponds to the selectable region.

16. The system of claim 14, wherein determining, for each selectable region, an analytical value further comprises determining an average quantity of pages per visit, for visits to the website which originated from the geographic area that corresponds to the selectable region.

17. The system of claim 14, wherein determining, for each selectable region, an analytical value further comprises determining an average time per visit, for visits to the website which originated from the geographic area that corresponds to the selectable region.

18. The system of claim 14, wherein determining, for each selectable region, an analytical value further comprises determining a percentage of new visits to the website, for visits to the website which originated from the geographic area that corresponds to the selectable region.

19. The system of claim 14, wherein determining, for each selectable region, an analytical value further comprises determining a bounce rate for visits to the website which originated from the geographic area that corresponds to the selectable region, the bounce rate establishing a percentage of the visits which visit a main page of a website but do not visit any other page of the website.

* * * * *